United States Patent [19]

Barry

[11] Patent Number: 5,078,880
[45] Date of Patent: Jan. 7, 1992

[54] VORTEX DESALINATION SYSTEM

[75] Inventor: William R. Barry, Granada Hills, Calif.

[73] Assignee: Water Technology Assessment Group, Palo Alto, Calif.

[21] Appl. No.: 581,719

[22] Filed: Sep. 12, 1990

[51] Int. Cl.$^5$ ............................................. B01D 21/26
[52] U.S. Cl. .............................. 210/512.1; 261/79.2; 55/237; 203/16; 203/DIG. 17; 203/49; 159/6.1; 159/16.1
[58] Field of Search ...................... 210/511, 512.1, 787, 210/789; 261/79.2; 53/237; 203/10, DIG. 17, 49; 159/16.1, 6.1; 62/90

[56] References Cited

U.S. PATENT DOCUMENTS

| | | | |
|---|---|---|---|
| 4,200,497 | 4/1980 | Rhodes | 203/DIG. 17 |
| 4,350,570 | 9/1982 | Maisotsenko et al. | 203/49 |
| 4,848,991 | 7/1989 | Bielefeldt | 210/512.1 |

OTHER PUBLICATIONS

Barry, W. R.; "Water for the Sonora Desert Area", (No date).
Barry, W. R.; "Egypt's Desert of Promise" no date.
Barry, W. R.; "Watering of the Arid Lands" no date.
Barry, W. R.; "The Water-Baja's Mystery", (Dec. 1970).
Shivley, G. P. et al.; "An Analytical & Experimental Study . . .".
Smith, J. L., Jr.; "An Analysis of the Vortex Flow . . . "(Dec. 1962).
Smith, J. L. Jr., "An Experimental Study of the Vortex . . . " 1962.
Wenquan, Pan; "An Analysis of a Tornado-Type Wind . . . " (no date).
Yen, James T.; "Tornado-Type Wind Energy System" (1975).
Barcilon, A. I.; "A Theoretical and Experimental Model . . ." (1967).
Church, C. R. et al.; "Tornado Vortex Simulation at . . . " (1977).
Davies-Jones, R. P., "The Dependence of Core Radius . . . " (1973).
Gulies, G. et al.; "Laboratory Production of Tornado--Like . . . " (Nov. 31, 1974).
Hide, R.; "High Vorticity Regions in Rotating Thermally . . . " (no date).
Hsu, C. T.; "Mechanism of Tornado Funnel Formation"(1976).
Maxworthy, T.; "On the Structure of Concentrated . . . " (1972).
Mullen, J. B. et al.; "A Laboratory Model of Dust Devi Vortices" (1977).
Snow, J. T.; "Pressure Fields Beneath Tornado-Like Vortices" (no date).
Vladimirov, V. A. "Formation of Vortex Filaments . . . " (Sep. 1977).
Wan, C. A. et al.; "Measurement of the Velocity Field . . . " (1972).
Ward, N. B.; "The Exploration of Certain Features . . . " (1972).
Golden, Joseph H.; "An Assessment of Waterspout Frequencies . . . " (Mar. 1973).
Golden, Joseph H.; "Scale-Scale-Interaction Implications . . . " (Sep. 1974).
Golden, Joseph H., "Some Statistical Aspects of Waterspout . . . " (Jun. 1973).

(List continued on next page.)

Primary Examiner—Robert A. Dawson
Assistant Examiner—David Reifsnyder
Attorney, Agent, or Firm—Thomas N. Giaccherini

[57] ABSTRACT

An apparatus for making fresh water from salt water comprising an air accelerator for generating a controlled wind-powered vortex of air in a tower located over a supply of salt water. The vortex of air creates a region of negative pressure over the salt water which causes fresh water to migrate up the tower to a condenser whereby the fresh water is condensed and collected in a collection through to then be used as a source of drinking water.

1 Claim, 6 Drawing Sheets

OTHER PUBLICATIONS

Golden, Joseph H.; "The Life Cycle of Florida Kays' Waterspouts, I" (Sep. 1974).
Hurd, Willis E.; "Some Phases of Waterspout Behavior" (Aug. 8, 1950).
Mooney, Michael J.; "Waterspout Watch" (summer 1990).
Barcilon, Albert et al.; "Dust Devli Formation" (1972).
Bruggraf, O. R. et al.; "Continuation of Breakdown in . . ." (1977).
Encyclopedia Britannica; Tornadoes, Whirlwinds and Waterspouts (1981).
Harlow, Francis H. et al.; "Structural Analysis of Tornado-Like . . ." (Nov. 1977).
Idso, Sherwood B.; "Tornado or Dust Devil" (no date).
Lewellen, W. S.; "Theoretical Models of the tornado Vortex" (no date).
Logan, Samuel E; "An Approach to the dust Devli Vortex" (Apr. 1971).
Sinclair, Peter C.; "On the Rotation of Dust Devils" (Jul. 1965).
Harvey, J. K.; "Sorre Observations of the Vortex . . ." (no date).
Lugt, Hans J.; "Vortex Flow in Nature and Technology" (1983).
Sarpkaya, Turgut; "On Stationary and Traveling Vortex . . ." (1971).
Beard, K. V. et al.; "A Determination of the Terminal Velocity . . ." (Sep. 1964).
MacDonald, S.; "The Drought Could Vanish into Thin Air" (Apr. 28, 1991).

VORTEX DESALINATION SYSTEM

BACKGROUND OF THE INVENTION

The present invention includes methods and apparatus for making fresh water from salt water. The inventor's innovative desalination system generates a controlled, wind-powered vortex of air in a tower located over a supply of salt water. The spinning column of air creates a region of negative pressure over the salt water which causes fresh water to cavitate and migrate up the tower to a fresh water collector.

Each year sources of pure drinking water become more scarce while the demand for these water supplies increases. Many areas of the United States have experienced extreme drought conditions in the past decade. Utilities usually measure water delivered for large-scale agricultural or industrial use in units called "acre-feet." An acre-foot is equivalent to the volume of water that would be required to cover one acre of flat land with a foot of water. This amount of water equals 325,800 gallons, or roughly a year's supply of water for a family of five. As traditional sources such as lakes, rivers, and wells are depleted, utilities have begun to investigate and to consider the desalination of sea water as a solution to this severe problem. Conventional desalination operations are extremely expensive. Several attempts to solve this problem, including evaporation and reverse osmosis systems, have achieved only modest success. None of the conventional systems provides an inexpensive yet effective means for producing potable water from salt water.

The shortcomings of previous water purification processes and devices has presented a major challenge to engineers and scientists. The development of a highly reliable yet cost-effective system that purifies ocean water for large-scale consumption would constitute a major technological advance. The new sources of fresh water that could be developed using such an innovative device would satisfy a long felt need and would help to avert a potential crisis faced by residents of a large portion of the United States.

A BRIEF DESCRIPTION OF THE DRAWINGS

FIG. 1 is a schematic illustration of a columnar vortex generator.

FIG. 2 presents a model of a vortex flow over a flat surface.

FIG. 3 is a graph that compares tangential wind speeds within a cyclone.

FIGS. 4(a, b, and c) display pressure distributions in a rotating solid body, in a potential vortex, and in a Rankine vortex.

A DETAILED DESCRIPTION OF A PREFERRED EMBODIMENT

Figure 1:
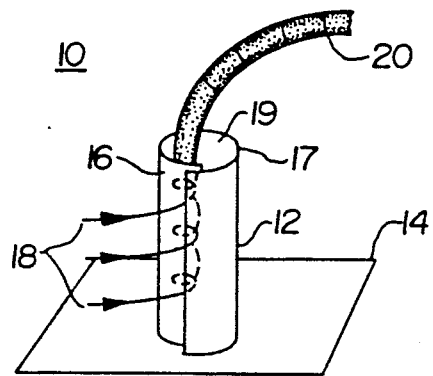

FIG. 1 presents a schematic depiction of a columnar vortex generator 10 which comprises an opened cylinder 12 placed on a flat surface 14. An opening 16 runs vertically along the length of the cylinder 12. Since the cylinder 12 is discontinuous, the cross-section of the cylinder 12 is shaped like a spiral 17. When a stream of air 18 is directed toward the opening 16, the air swirls into the interior 19 of the cylinder 12 and creates a spinning tower of air called a vortex 20.

Figure 2:
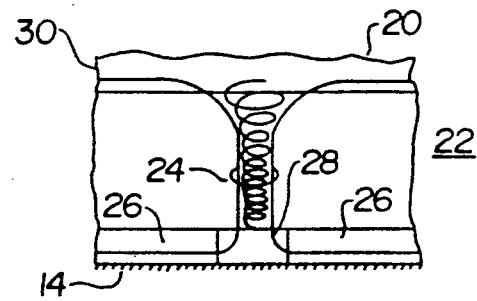
Figure 3:
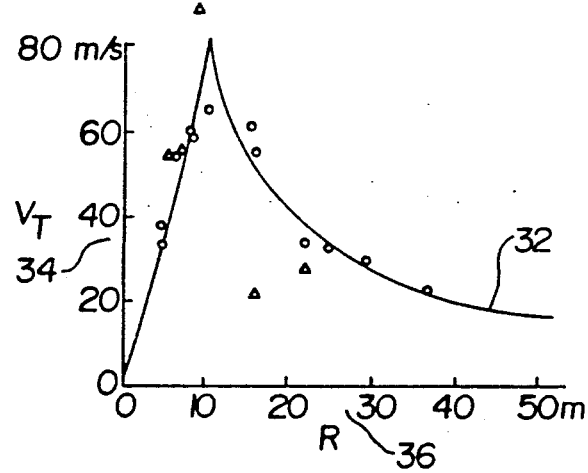

FIG. 2 is a cross-sectional view of a vortex 20 spinning over a flat surface 14. FIG. 3 is a graph 32 which reveals the speed 34 of air circulating within a vortex 20. These speeds 34 are measured at various radial distances 36 from the center of the cyclone 20. The data 32 presented indicate that the maximum flow of air occurs at a distance of about ten meters from the center.

Figure 4A:
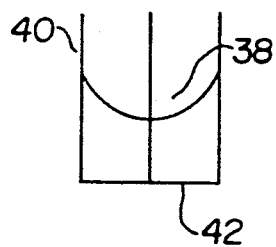
Figure 4B:
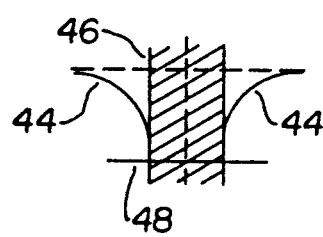
Figure 4C:
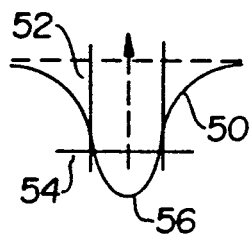

FIGS. 4(a, b, and c) exhibit plots of pressure distributions versus radial distance for a rotating solid body 38, a potential vortex 44, and a Rankine vortex 50. As shown in FIGS. 4(b) and 4(c), the pressure 44 and 50 within a cyclone increases from the center out to the radial edge of the vortex. The curve 50 shown in FIG. 4(c) displays pressure levels for a vortex spinning over water 54. The pressure in the central region 56 of this cyclone can be so low that the water 54 evaporates and rises. This process, called "cavitation", can occur far below the familiar boiling temperature of water, 212 degrees Fahrenheit (100 degrees Centigrade), for 1 atmosphere of air pressure. Cavitation levitates some water molecules above the liquid water 54 below the vortex because of the reduced pressure 50 in the central region 56 of the through the vortex by the "negative" pressure created by the rotating air column. The water surface 54 below the area of decreased pressure can actually assume the shape of a shallow bowl or depression. The depth, h, of such of depression is given by the equation:

$$h = g^{-1} v_m^2 \qquad \text{(Equation 1)}$$

where $v_m$ is the surface water speed at the radius location that experiences the maximum wind speed and $g = 32$ ft/sec.

Figure 5:
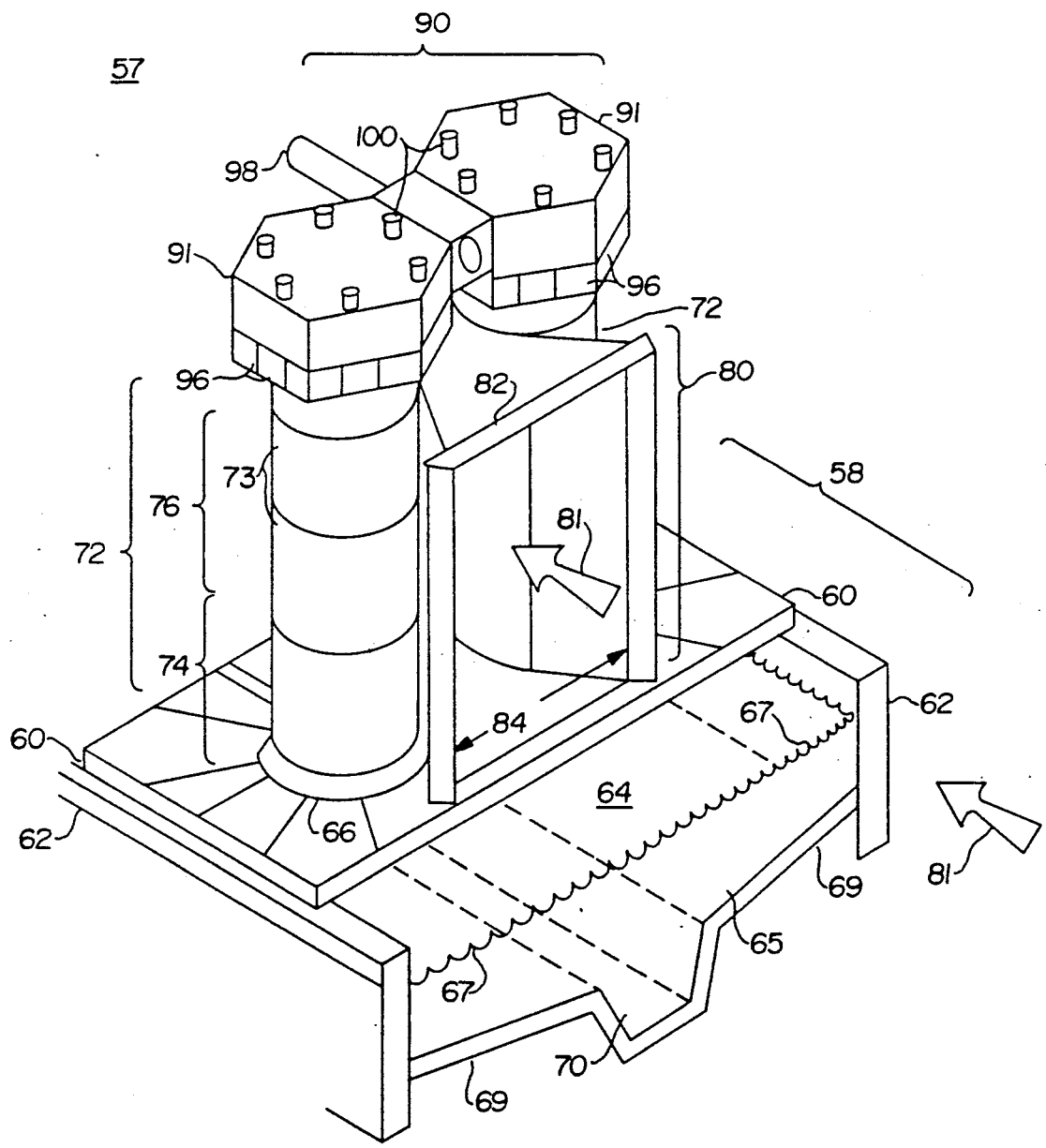
FIG. 5 is a schematic, partial cross-sectional, perspective view of the present invention.

FIG. 5 presents a perspective, schematic, partial, cross-sectional view of the preferred embodiment of the present invention 57. A base 58 including a platform 60 and side walls 62 define a salt water chamber 64 filled with salt water 66 from the ocean. The platform 60 has an air/salt water interface opening 66 which provides access to the water surface 67 immediately below it. A salt water intake 68 (not shown in FIG. 5) supplies water 65 from the ocean. The chamber 64 includes a bottom 69 that has a salt collecting trough 70 running along the central region of the bottom 69.

The preferred embodiment of the invention 57 comprises two generally cylindrical towers 72. Alternative embodiments of the invention may employ one or any number of coupled towers 72. Each tower 72 has a lower input portion 74 and an upper output portion 76, as well as a side opening 78 that extends along the height of each tower 72. The towers 72 are assembled from curved panels 73 joined by ribs 79. In the tandem embodiment portrayed in FIG. 5, both towers 72 share one side opening 78.

Figure 6:
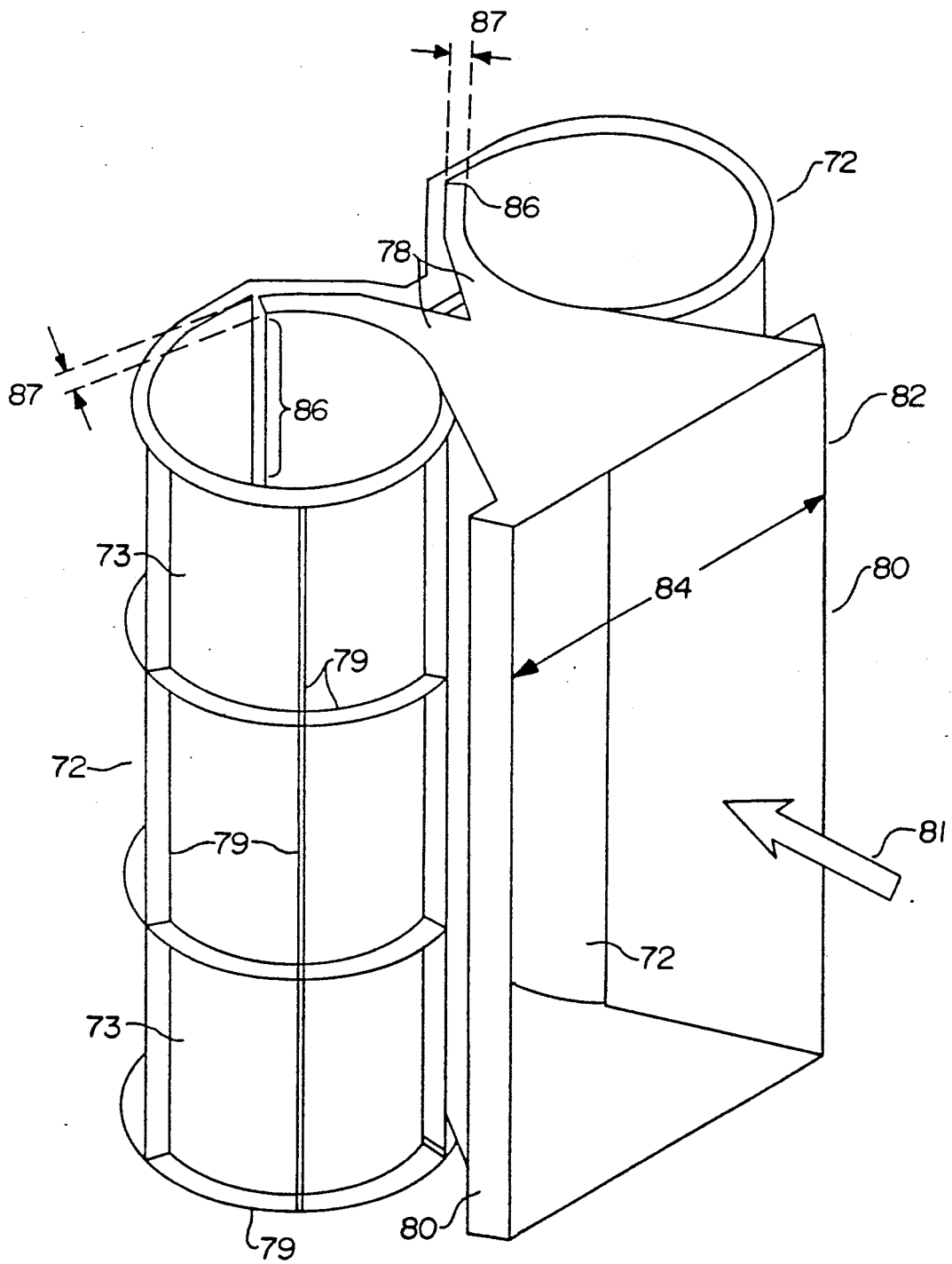
FIG. 6 is a schematic, partial view of the tower and air accelerator portions of the device shown in FIG. 5.

FIG. 6 reveals an air accelerator 80 connected to each tower 72 through the side opening 78. The invention 57 is powered by wind 81 which flows into the tower 72 through an air intake port 82 and an air injection nozzle 86. The air intake port 82 has a air input area equal to the product of the height of the tower 72 and the distance identified by reference numeral 84. The air injection nozzle 86 inside the air accelerator 80 (best seen in FIG. 7) has a air output area equal to the product of the height of the tower 72 and the distance identified by reference numeral 87. In the preferred embodiment of the invention, the air input area is about nine times larger than the air output area. The air input area must generally be at least four times greater than that of the air output area.

Figure 7:
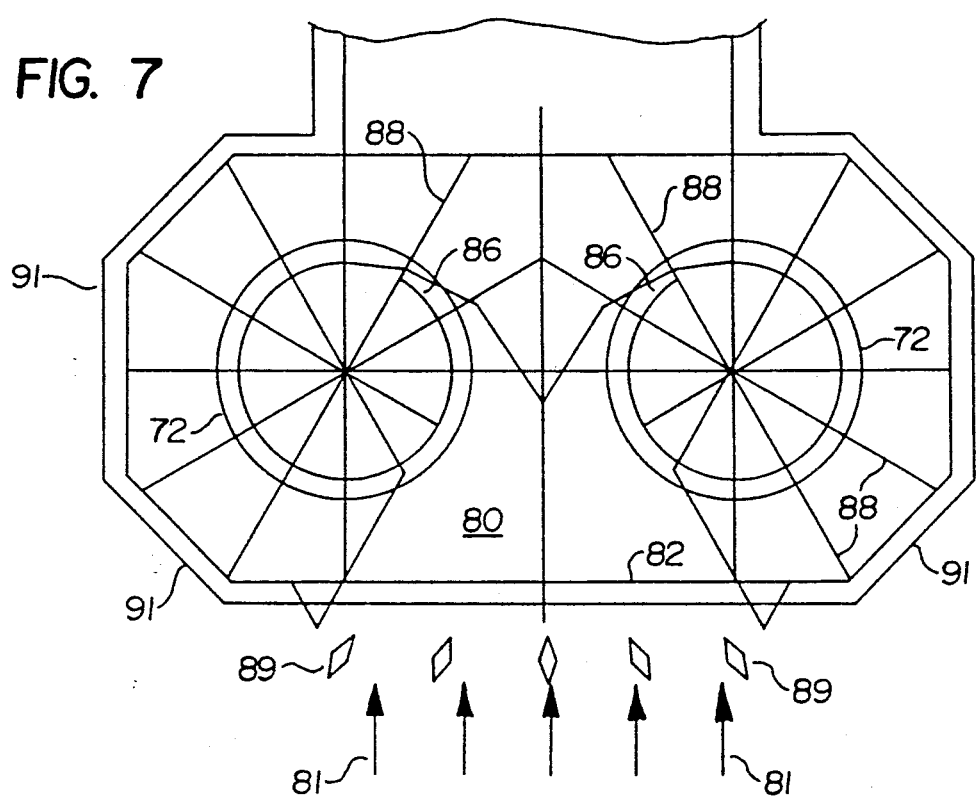
FIG. 7 is a top view of the apparatus pictured in FIG. 6.
Figure 8:
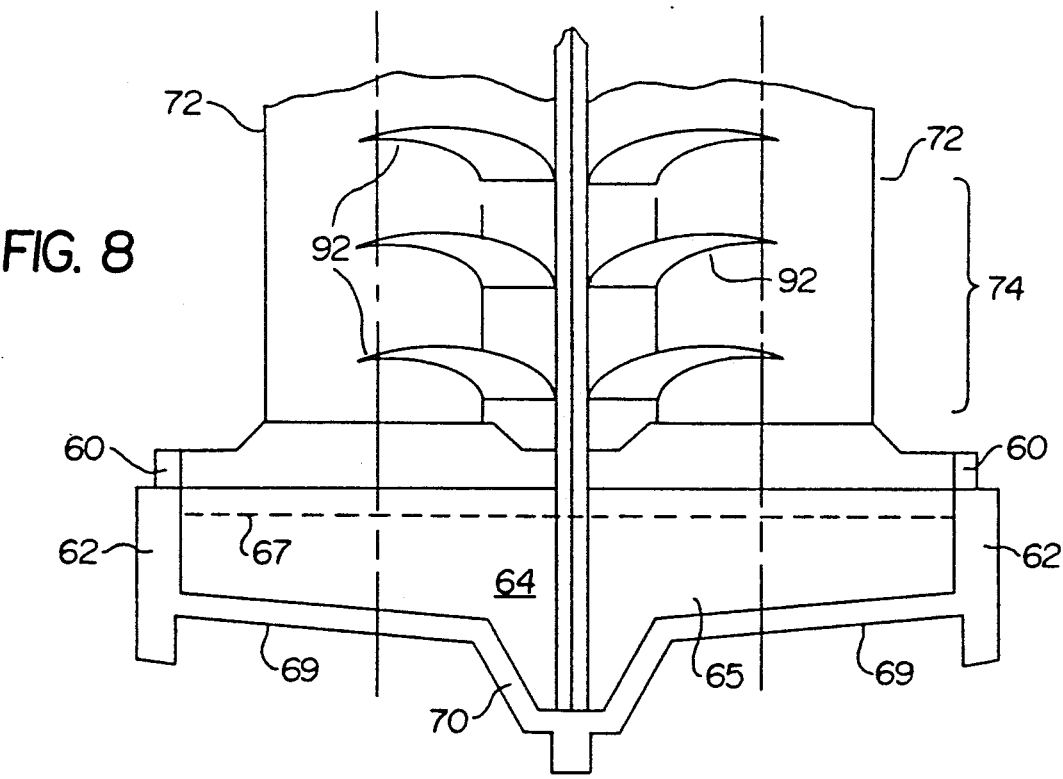
FIG. 8 is a partial cross-sectional view of the apparatus illustrated in FIG. 6.
Figure 9:
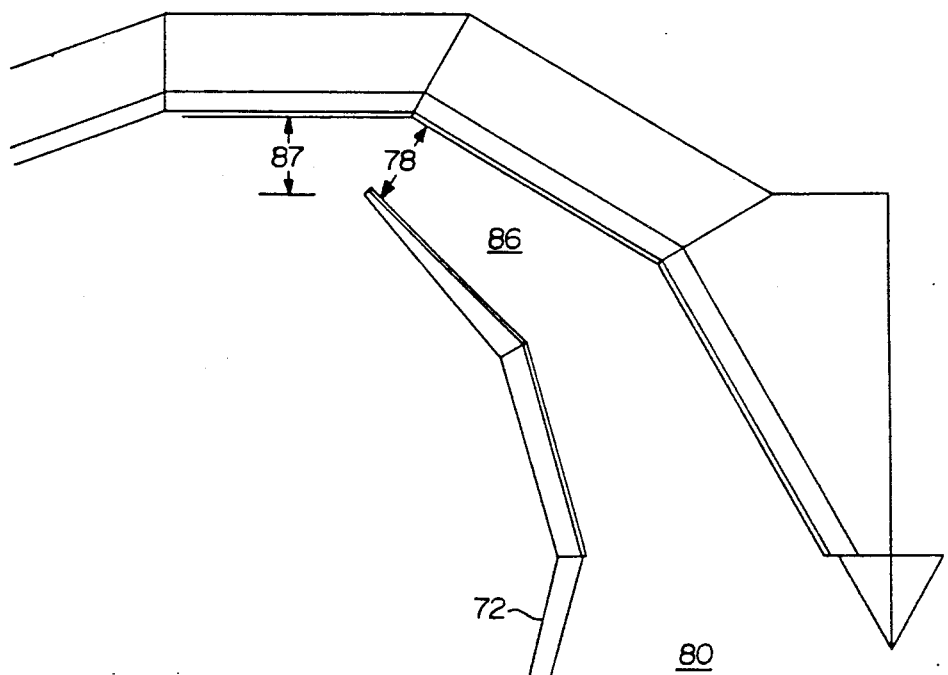
FIG. 9 is an enlarged, schematic, partial, top view of one of the tower sections.
Figure 9:
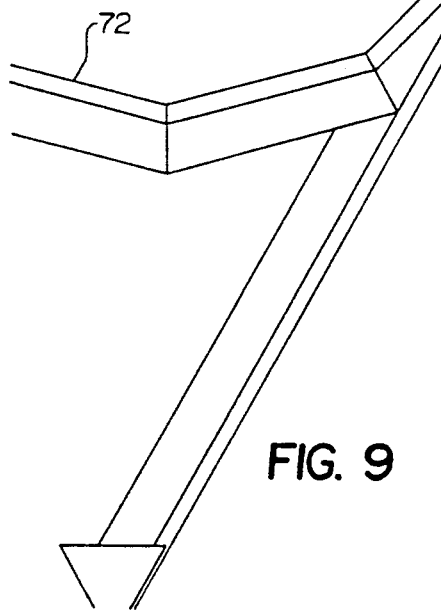
Figure 10:
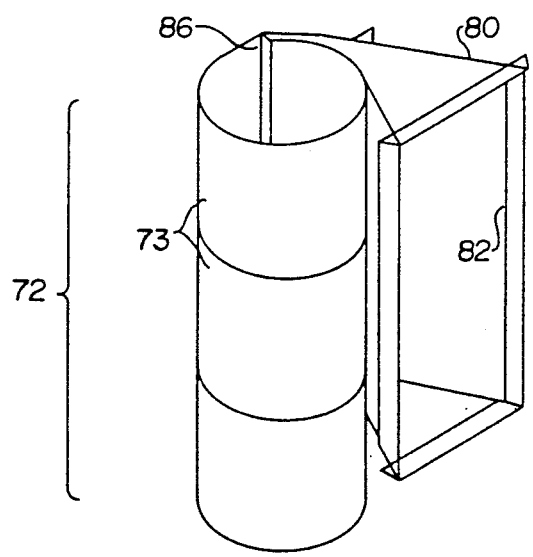
FIG. 10 is a perspective view of a tower section connected to an air accelerator section.

The upper output portion 76 of each tower 72 is capped by a fresh water condensation and collection section 90 which has a generally hexagonal housing 91. The interior condensation and collection section 90 is portrayed in FIGS. 5, 7, 11, and 12. FIG. 7 exhibits some of the details of the interior of the tower 72 and condenser and collector 90, including support beams 88 and movable wind director vanes 89. FIG. 8 shows a series of vortex control baffles 92 which extend into the center of each tower 72. FIG. 9 provides an enlarged view of one of the towers 72 and the interior portion of an air accelerator 80. FIG. 10 shows a single tower 72 coupled to an air accelerator 80.

Figure 11:
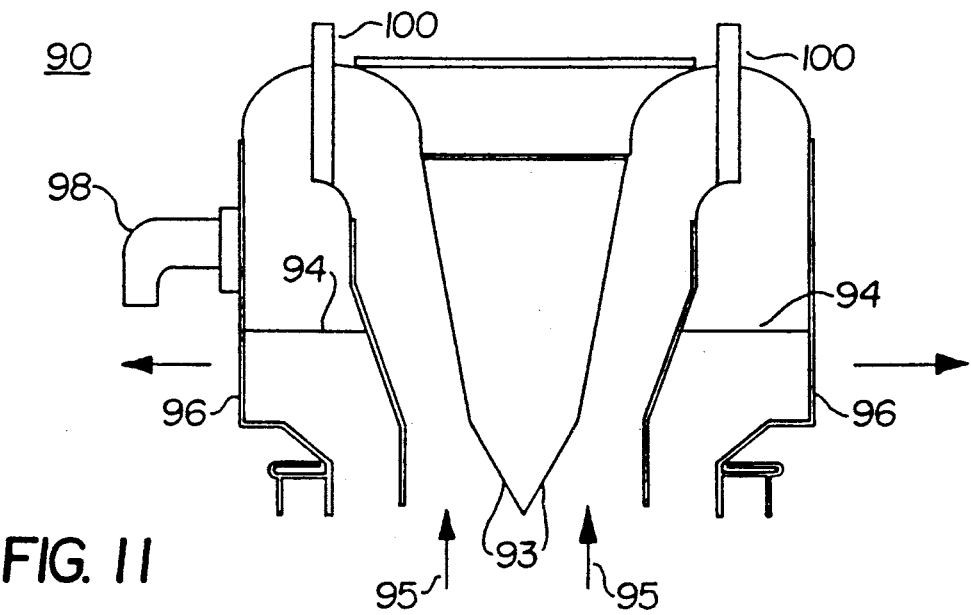
FIG. 11 is a cross-sectional illustration of the water condensation and collection section that resides atop the tower section.
Figure 12:
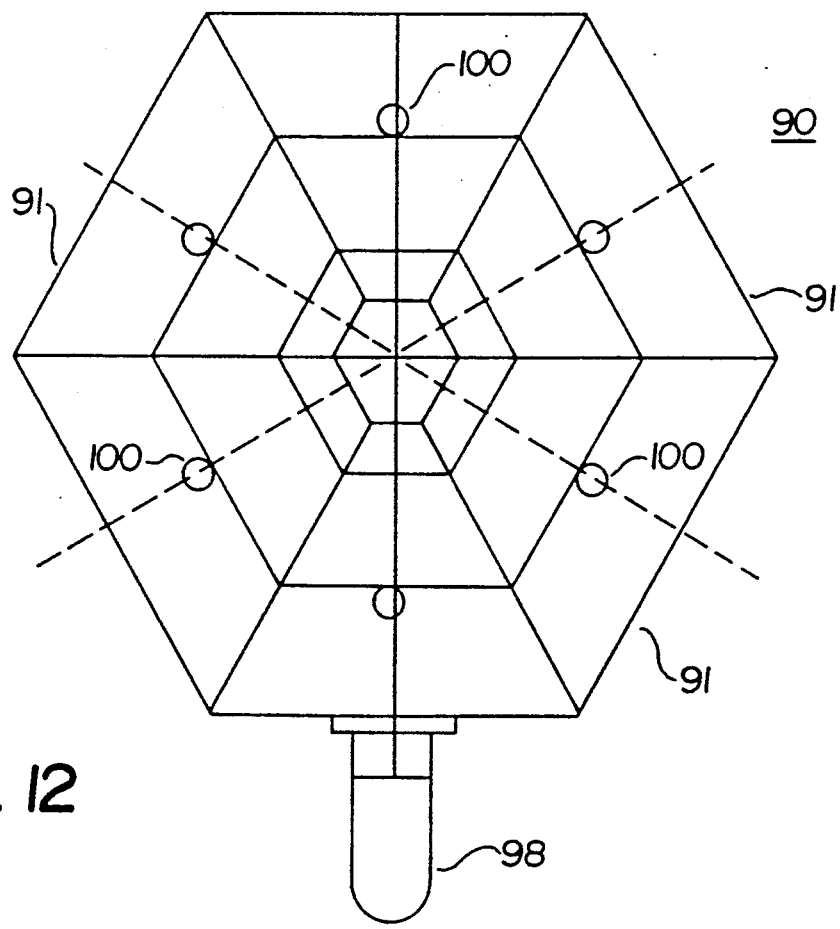
FIG. 12 is a top view of the water condensation and collection section depicted in FIG. 11.

FIG. 11 is a cross-sectional side view of the condensation and collection section 90, which comprises a housing 91, a condensate spray intake 93, a trough 94 which collects rising water 95, a vortex flow exit 96, a fresh water output tube 98, and six air bleeds 100.

Although the present invention has been described in detail with reference to a particular preferred embodiment, persons possessing ordinary skill in the art to which this invention pertains will appreciate that various modifications and enhancements may be made without departing from the spirit and scope of the claims that follow. The List of Reference Numerals which follows is intended to provide the reader with a convenient means of identifying elements of the invention in the specification and drawings. This list is not intended to delineate or narrow the scope of the claims.

LIST OF REFERENCE NUMERALS

FIG. 1

10 Columnar vortex generator
12 Opened cylinder
14 Flat surface
16 Side opening along cylinder
17 Spiral
18 Airstream
19 Interior of cylinder
20 Vortex

FIG. 2

22 Model of vortex
24 Region I
26 Region II
28 Region III
30 Region IV

FIG. 3

32 Graph of wind speed vs. radius
34 Tangential air speed
36 Distance from center of vortex

FIG. 4

38 Pressure in solid-body rotation
40 Pressure
42 Radius
44 Pressure in potential vortex
46 Pressure
48 Radius
50 Pressure in Rankine vortex
52 Pressure
54 Water surface
56 Minimum pressure at center of vortex

FIG. 5

57 Vortex Desalination System
58 Base
60 Platform
62 Side walls
64 Salt water chamber
65 Salt water
66 Air/salt water interface opening
67 Water surface
68 Salt water intake
69 Chamber bottom
70 Salt slough clean out trough
72 Tower
73 Tower segments
74 Lower input portion of tower
76 Upper output portion of tower
78 Side opening
79 Ribs
80 Air accelerator
81 Wind
82 Air intake port
84 Distance
86 Air injector nozzle
87 Distance
88 Support beams
89 Movable wind director vanes
90 Fresh water condenser and collector
91 Hexagonal housing
92 Vortex baffles
93 Condensate spray intake
94 Water collection trough
95 Water
96 Vortex flow exit
98 Fresh water output tube
100 Air bleed

What is claimed is:

1. An apparatus comprising:

a base means (58) for providing support; said base means (58) including a salt water chamber (64) filled with a supply of salt water (65); said base means (58) also having an air/salt water interface opening (66) located over said salt water chamber (64);

a tower means (72) for providing containment; said tower means (72) extending above said base means (58); said tower means (72) having a generally cylindrical cross-section; said tower means (72) having a substantially open, lower input portion (74) and a substantially closed, upper output portion (76); said tower means (72) also having a vertically extending side opening (78); said lower input portion (74) being located over said salt water chamber (64);

an air accelerator means (80) for generating a vortex; said air accelerator means (80) being coupled to said vertically extending side opening (78) of said tower means (72); said air accelerator means (80) including an air intake port (82) having an air input area and an air injector nozzle (86) having an air output area; said air input area being at least four times greater than said air output area; and a fresh water condensation and collection means (90) for extracting fresh water from said tower means (72); said fresh water condensation and collection means (90) being attached to said upper output portion (76) of said tower means (72); said fresh water condensation and collection means (90) including:

a condensate spray intake (93);

a water collection trough (94) coupled to said condensate spray intake (93);

a vortex flow exit (96);

a fresh water output tube (98) coupled to said water collection trough (94); and an air bleed (100) located on said tower means (72).

* * * * *